United States Patent
Gaut et al.

(10) Patent No.: US 10,919,244 B2
(45) Date of Patent: Feb. 16, 2021

(54) METHOD AND APPARATUS FOR MOLDING NON-PNEUMATIC WHEELS

(71) Applicants: Compagnie Generale des Etablissements Michelin, Clermont-Ferrand (FR); Michelin Recherche et Technique S.A., Granges-Paccot (CH)

(72) Inventors: Robert Gaut, Easley, SC (US); Brian D. Wilson, Greenville, SC (US); Karl Mohrmann, Easley, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 411 days.

(21) Appl. No.: 15/536,318

(22) PCT Filed: Dec. 8, 2015

(86) PCT No.: PCT/US2015/064428
§ 371 (c)(1),
(2) Date: Jun. 15, 2017

(87) PCT Pub. No.: WO2016/100005
PCT Pub. Date: Jun. 23, 2016

(65) Prior Publication Data
US 2018/0043647 A1 Feb. 15, 2018

Related U.S. Application Data

(63) Continuation of application No. PCT/US2014/070796, filed on Dec. 17, 2014.

(51) Int. Cl.
*B29D 30/02* (2006.01)
*B60C 7/00* (2006.01)

(52) U.S. Cl.
CPC .............. *B29D 30/02* (2013.01); *B60C 7/00* (2013.01); *B60C 2007/005* (2013.01)

(58) Field of Classification Search
CPC ...... B29D 30/02; B60C 2007/005; B60C 7/00
See application file for complete search history.

(56) References Cited

U.S. PATENT DOCUMENTS 4,669,964 A 6/1987 Amano
4,832,098 A 5/1989 Palinkas
(Continued)

FOREIGN PATENT DOCUMENTS

CN 103009909 A 4/2013
EP 2955009 A1 12/2015
(Continued)

OTHER PUBLICATIONS

International Search Report for PCT/US2014/070812 dated Mar. 31, 2015.
(Continued)

*Primary Examiner* — Alexander M Weddle
(74) *Attorney, Agent, or Firm* — Dority & Manning, P.A.

(57) ABSTRACT

A method and apparatus for molding non-pneumatic wheels is provided. The exemplary method and apparatus allow for the use of the same molding system to manufacture wheels with different hub constructions. Different configurations of removable mold elements are utilized within the same molding system to provide wheels with different hub constructions.

17 Claims, 6 Drawing Sheets

(56) References Cited

U.S. PATENT DOCUMENTS

| | | |
|---|---|---|
| 4,945,962 A | 8/1990 | Pajtas |
| 5,645,870 A | 7/1997 | Larsen |
| 7,201,194 B2 | 4/2007 | Rhyne et al. |
| 8,567,461 B2 | 10/2013 | Williams et al. |
| 9,248,697 B2 | 2/2016 | Iwamura |
| 9,616,703 B2 | 4/2017 | Nishida et al. |
| 2004/0159385 A1 | 8/2004 | Rhyne |
| 2004/0187996 A1 | 9/2004 | Grah |
| 2008/0073014 A1 | 3/2008 | Abe |
| 2009/0107596 A1* | 4/2009 | Palinkas ................ B29D 30/02 152/209.1 |
| 2010/0200131 A1 | 8/2010 | Iwase |
| 2011/0024008 A1 | 2/2011 | Manesh |
| 2012/0038206 A1 | 2/2012 | Chadwick |
| 2012/0205017 A1 | 8/2012 | Endicott |
| 2012/0234445 A1 | 9/2012 | Manesh |
| 2013/0209595 A1 | 8/2013 | Speck |
| 2013/0284329 A1 | 10/2013 | Wilson |
| 2013/0287882 A1 | 10/2013 | Wilson |
| 2014/0034219 A1 | 2/2014 | Chadwick et al. |
| 2014/0070439 A1 | 3/2014 | Martin |
| 2014/0083581 A1 | 3/2014 | Schaedler et al. |
| 2014/0159280 A1 | 6/2014 | Caterpillar |
| 2014/0251518 A1 | 9/2014 | Abe et al. |
| 2017/0368774 A1* | 12/2017 | Gaut ...................... B29D 30/02 |

FOREIGN PATENT DOCUMENTS

| | | |
|---|---|---|
| WO | WO 2005/063505 A1 | 7/2005 |
| WO | WO 2012/030519 A2 | 3/2012 |
| WO | WO 2013/130047 | 9/2013 |
| WO | WO2016/100004 A1 | 6/2016 |
| WO | WO2016/100006 A1 | 6/2016 |

OTHER PUBLICATIONS

International Search Report for PCT/US15/64426 dated Feb. 2, 2016.

International Search Report for PCT/US15/64428 dated Apr. 21, 2016.

International Search Report for PCT/US15/64433 dated Feb. 16, 2016.

International Search Report for PCT/US14/070784 dated Apr. 1, 2015.

International Search Report for PCT/US14/070796 dated Mar. 31, 2015.

* cited by examiner

METHOD AND APPARATUS FOR MOLDING NON-PNEUMATIC WHEELS

PRIORITY STATEMENT

The present application claims priority to PCT/US14/70796, filed Dec. 17, 2014 in the United States Receiving Office.

FIELD OF THE INVENTION

The subject matter of the present disclosure relates generally to a method and apparatus for molding non-pneumatic wheels.

BACKGROUND OF THE INVENTION

Non-pneumatic wheel constructions and their benefits are described in e.g., U.S. Pat. Nos. 6,769,465; 6,994,134; 7,013,939; and 7,201,194. Some non-pneumatic tire constructions propose incorporating a shear band, embodiments of which are described in e.g., U.S. Pat. Nos. 6,769,465 and 7,201,194, which are incorporated herein by reference. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of web elements extending radially from a center element or hub. For certain constructions, such non-pneumatic wheel may be formed by open cast molding in which a material such as e.g., polyurethane is poured into a mold that forms all or part of the non-pneumatic tire. Reinforcements in various parts of the non-pneumatic wheel may be molded in place. For example, one or more inextensible reinforcements such as cords may be molded in place in the compliant band.

The molds used to cast such non-pneumatic wheel constructions are a substantial part of the overall expense of manufacturing. Multiple, intricate features must be used to mold e.g., the individual web elements that extend between the hub and compliant band. Typically, the molds are carefully machined from metal having a high thermal conductivity such as e.g., aluminum.

The hub is used to connect the non-pneumatic wheel with a vehicle. The hub may be connected directly to the vehicle or may be connected through another component such as a wheel center. A variety of different constructions or configurations may be used for the hub, which may be constructed in whole or in part from one or more metals. Because of the associated expense of creating the molds, a requirement of different molds for different hub configurations is undesirable.

Accordingly, a method and apparatus for molding non-pneumatic wheels would be useful. More particularly, a method and apparatus that allows use of the same mold for manufacturing non-pneumatic wheels with different hub configurations would be particularly beneficial.

SUMMARY OF THE INVENTION

The present invention provides a method and apparatus for molding a non-pneumatic wheel. The exemplary method and apparatus allow for the use of the same molding system to manufacture wheels with different hub constructions. More particularly, multiple configurations of removable mold elements are utilized within the same molding system to provide wheels with different hub constructions. The present invention can provide a savings in manufacturing cost by avoiding the requirement of a different mold for each hub configuration. Additional objects and advantages of the invention will be set forth in part in the following description, or may be apparent from the description, or may be learned through practice of the invention.

In one exemplary embodiment, the present invention provides an adjustable molding system for a non-pneumatic wheel, the non-pneumatic wheel including a plurality of tension-transmitting web elements extending between a load support band and a hub, the non-pneumatic wheel defining axial, radial, and circumferential directions. The molding system includes an upper mold portion having a plurality of upper web forming elements spaced apart around the circumferential direction. A lower mold portion has a plurality of lower web forming elements spaced apart around the circumferential direction and are configured to receive the upper web forming elements when the molding system is in a closed position to form the tension transmitting web elements during the molding process. The upper mold portion and lower mold portion form an internal cavity when the molding system is in the closed position.

This exemplary adjustable molding system includes a first configuration and a second configuration of removable mold elements for positioning within the internal cavity. The first configuration includes an upper mold bowl configured to form a surface of the wheel; a lower mold bowl supporting the upper mold bowl and configured to form a surface of the wheel; and a retainer configured for receipt of the lower mold bowl, the retainer positionable onto the lower mold portion. The second configuration includes a cap and a shield positionable below the cap onto the lower mold portion. The first and second configurations of removable mold elements are interchangeable within the internal cavity.

In another exemplary aspect, the present invention provides a method of molding a non-pneumatic wheel using a molding system that includes an upper mold portion and a lower mold portion that can be selectively joined to form an internal cavity. The method includes the steps of positioning a first configuration of removable mold elements into the molding system, the first configuration including a lower mold bowl that is positioned onto the lower mold portion; placing a compliant, load supporting band onto the lower mold portion; inserting an upper mold bowl onto the lower mold bowl; placing an upper mold portion onto the lower mold portion; and heating the lower mold bowl, upper mold bowl, and load supporting band to a predetermined temperature. A second configuration of removable mold elements can be provided that is interchangeable with the first configuration so as to provide for the manufacture of non-pneumatic wheels with different hub configurations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 2:
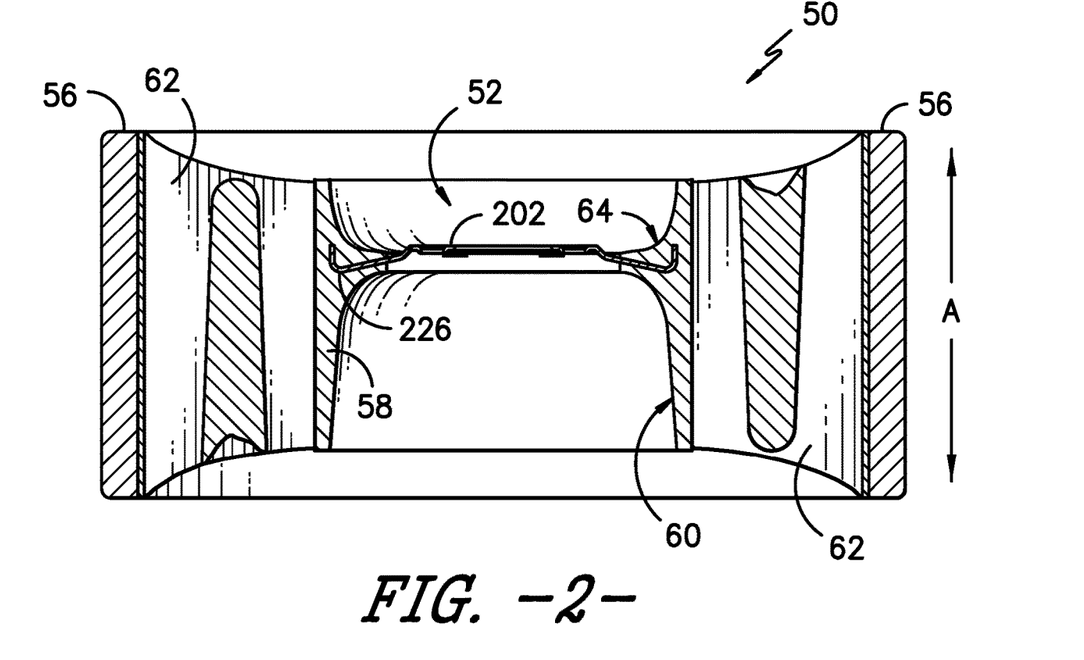
FIG. 2 illustrates a cross-sectional view along a meridian plane of the exemplary wheel of FIG. 1.
Figure 3:
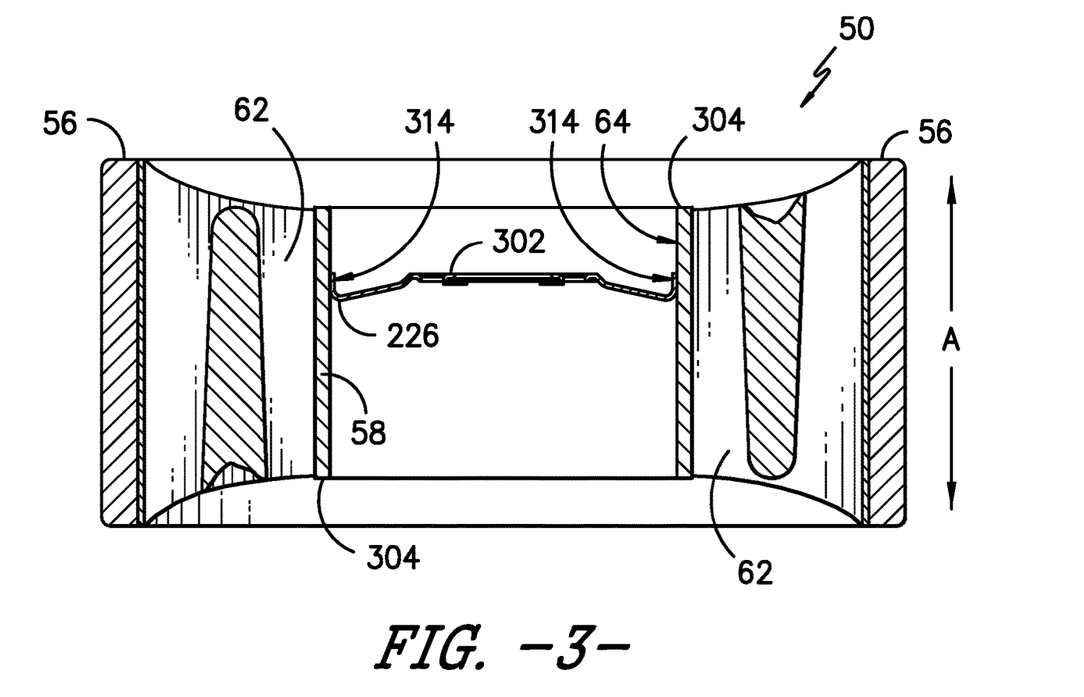
FIG. 3 illustrates a cross-sectional view along a meridian plane of another exemplary wheel of the present invention.

As used herein, the following definitions apply:

"Meridian plane" is a plane within which lies the axis of rotation of the tire or wheel. FIGS. 2 and 3, for example, are cross-sections of an exemplary non-pneumatic wheel of the present invention taken along a meridian plane.

The "radial direction" is perpendicular to the axis of rotation of the tire or wheel and denoted with R.

The "axial direction" is parallel to the axis of rotation of the tire or wheel and perpendicular to the radial direction. The axial direction is denoted with A.

The "circumferential direction" follows the circumference of the tire or wheel and is denoted with C.

Figure 1:
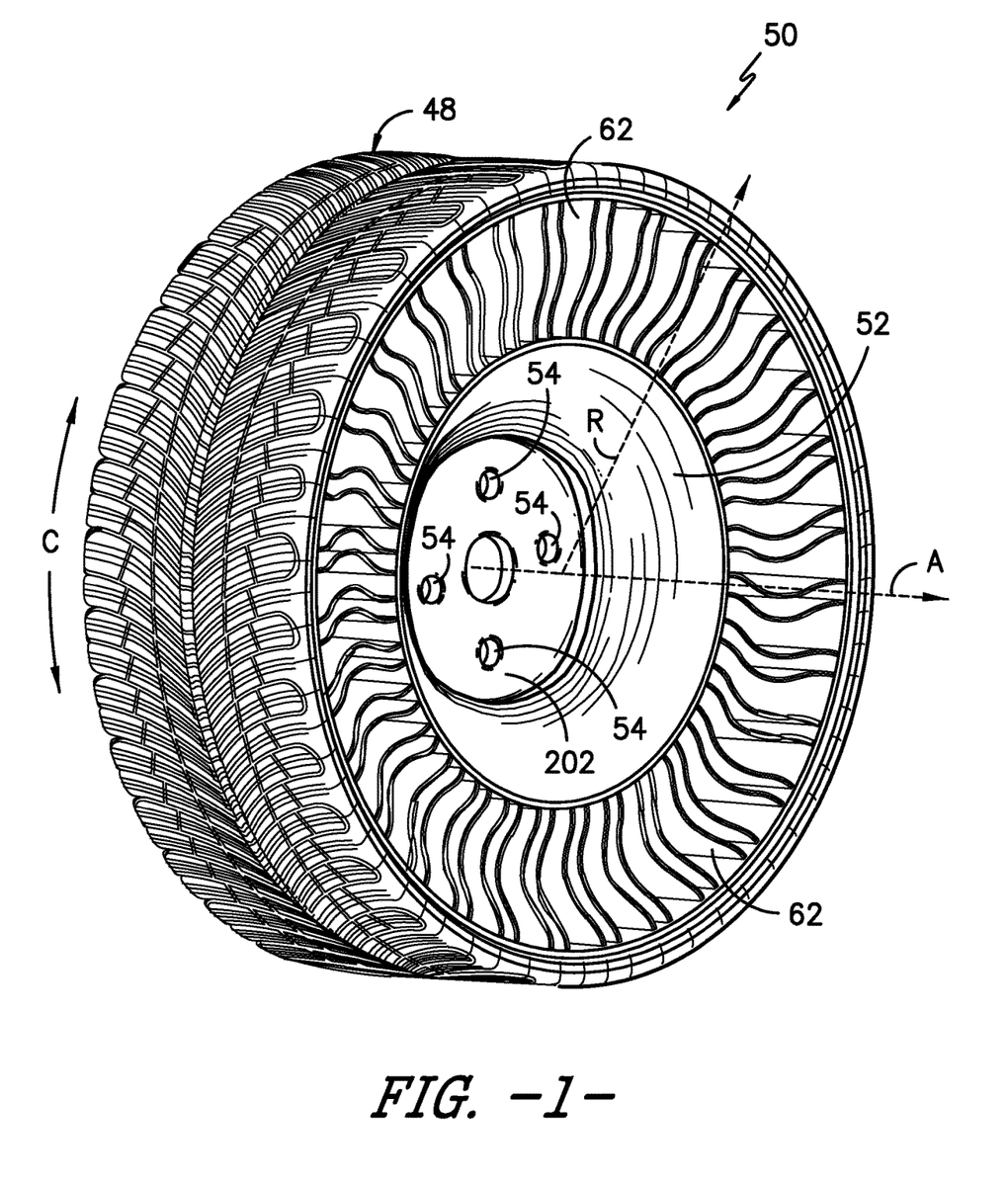
FIG. 1 illustrates a perspective view of an exemplary non-pneumatic wheel of the present invention.

FIG. 1 provides a perspective view of an exemplary non-pneumatic wheel 50 that can be manufactured using the present invention while FIG. 2 provides a cross-sectional view of wheel 50 taken along a meridian plane. The present invention is not limited to the particular shape, size, or appearance of the wheels shown in the figures. As will be understood using the teachings disclosed herein, wheels of other shapes, sizes, and appearances may be used as well.

Non-pneumatic wheel 50 includes a central mounting disk 202 this is provided with a series of apertures 54 through which threaded lugs or other fasteners may be inserted in order to mount wheel 50 onto a vehicle. Other mounting configurations may be used as well. Non-pneumatic wheel 50 also includes a compliant, load supporting band 56 positioned radially outward of a hub 52 and positioned concentrically with hub 52. A tread 48 may be formed on, or provided as part of, load supporting band 56. For example, a tread band may be adhered to load supporting band 56.

A plurality of tension-transmitting web elements 62 extend along the radial direction R between hub 52 and load supporting band 56. Web elements 62 are adjacent to one another and spaced apart about circumferential direction C of wheel 50. Web elements 62 may have other shapes and configurations from what is shown in FIG. 1. Load supporting band 56 supports loads transmitted to non-pneumatic wheel 50 when mounted to a vehicle using mounting disk 202. The load is transmitted by tension through web elements 62 to compliant band 56.

By way of example, load supporting band 56 may include a shear band having an inner reinforcing band, outer reinforcing band, and a shear layer positioned therebetween. The shear layer may be constructed e.g. of an elastomeric material such as e.g., natural and synthetic rubbers, polyurethanes, foamed rubbers and polyurethanes, segmented copolyesters, and block co-polymers of nylon. The reinforcing bands may include reinforcements constructed from e.g., essentially inextensible cord reinforcements embedded in an elastomeric coating. Such reinforcements may include e.g., any of several materials suitable for use as tire belt reinforcements in conventional tires such as monofilaments or cords of steel, aramid or other high modulus textiles. Other constructions and materials may be used as well.

For the exemplary embodiment of FIGS. 1 and 2, hub 52 is connected with a central mounting disk 202 embedded within an outer toroidal portion 58 of hub 52 using an exemplary molding system as described herein. By way of example, central mounting disk 202 may be constructed from a metal whereas hub 52 may be constructed from a polymeric material into which disk 202 can be molded. The polymeric material in the present embodiment, also referred to herein as the molding material, may be any suitable polymeric material such as e.g., a natural or synthetic rubber, polyurethane, foamed rubber and foamed polyurethane, segmented copolyesters, and block co-polymers of nylon.

Mounting disk 202 may be provided with one or more features to assist in securing disk 202 to outer toroidal portion 58 of hub 52. For example, disk 202 may include a lip or bend 226 extending circumferentially about disk 202. Mounting disk 202 may also include openings 228 (FIG. 4) through which material may extend during the molding process. Other features may be used as well.

FIG. 3 provides a cross-sectional view of another exemplary embodiment of wheel 50 taken along a meridian plane where the same reference numerals denote the same or similar features as used in the embodiment of FIGS. 1 and 2. For this exemplary embodiment, wheel 50 also includes a central mounting disk 302. However, mounting disk 302 is not embedded within hub 304. Instead, mounting disk 302 is attached to hub 50 along a flange 314. By way of example, central mounting disk 302 and hub 304 may be constructed of one or more metals and welded or cast together.

Figure 4:
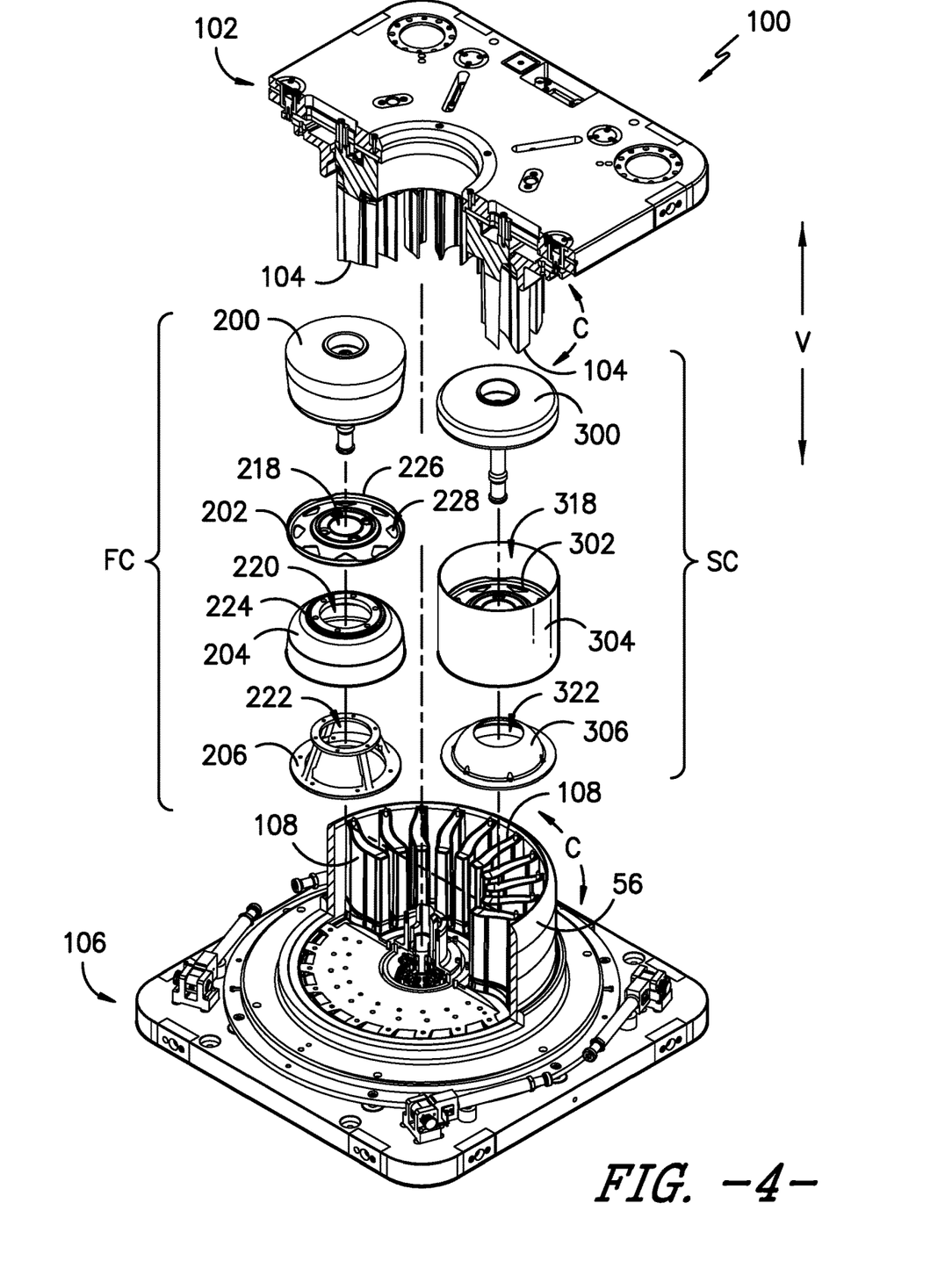
FIG. 4 is a partial cross-sectional and exploded perspective view of an exemplary molding system as may be used to manufacture the non-pneumatic wheels of FIGS. 1, 2, and 3.
Figure 5:
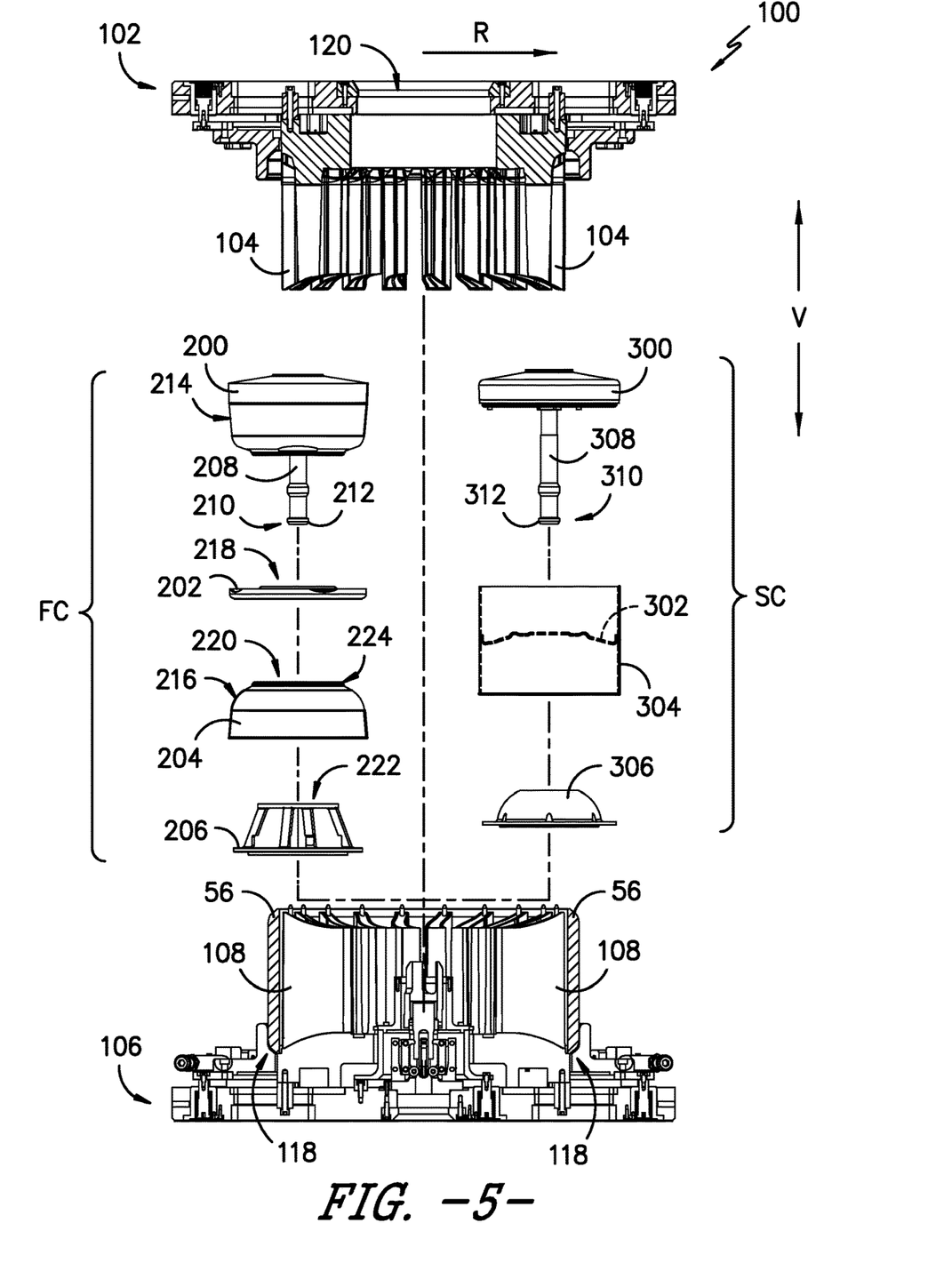
FIG. 5 is a partial cross-sectional and exploded side view of an exemplary molding system as may be used to manufacture the non-pneumatic wheels of FIGS. 1, 2.

FIG. 4 provides a perspective view of an exemplary embodiment of an adjustable molding system 100 for a non-pneumatic wheel while FIG. 5 provides a side view of the same system 100. Molding system 100 has a first configuration FC of removable mold elements that may be used to mold the exemplary wheel 50 of FIGS. 1 and 2. Molding system 100 also has a second configuration SC of removable mold elements that may be used to mold the exemplary wheel 50 of FIG. 3. In addition, first configuration FC and second configuration SC are interchangeable with each other within molding system 100 as will be further described in order to manufacture wheels with different hub configurations. In FIGS. 4 and 5, first configuration FC and second configuration SC are each shown in an exploded, non-sectional view to show their sequencing relative to each other within molding system 100. Only one configuration, FC or SC, is used at time during the molding of a non-pneumatic wheel.

Molding system 100 includes an upper mold portion 102 and a lower mold portion 106. In FIGS. 1 and 2, the upper mold portion 102 and part of the lower mold portion 106 are shown in sectional views to more clearly reveal certain interior components. Along with the FC and SC configurations of interchangeable mold elements, upper and lower mold portions 102 and 106 can be used to make the exemplary embodiment FIGS. 1 and 2 as well as the exemplary embodiment of FIG. 3, which allows for a substantial savings in production costs by e.g., the avoidance individual molds for each embodiment of the non-pneumatic wheels.

Upper mold portion 102 includes a plurality of upper web forming elements 104 spaced apart along circumferential direction C. Lower mold portion 106 includes a plurality of lower web forming elements 108 also spaced apart along circumferential direction C. When molding system 100 is in a closed position as depicted in the cross-sectional views of FIGS. 6 and 7, web forming elements 104 and 106 can be used to mold tension transmitting elements 62 of either of the previously described exemplary embodiments of non-pneumatic wheel 50. More particularly, in the closed position, the lower web forming elements 108 interlock with the upper web forming elements 104 to provide spaces therebetween for the formation of the web-like, tension transmitting elements 62 during the molding process in which a molding material such as e.g., polyurethane is poured into molding system 100. In other embodiments of system 100, web forming element 104 and 108 may meet to each form only a portion (e.g., half) of the web elements 62. Other constructions may be used as well.

Figure 6:
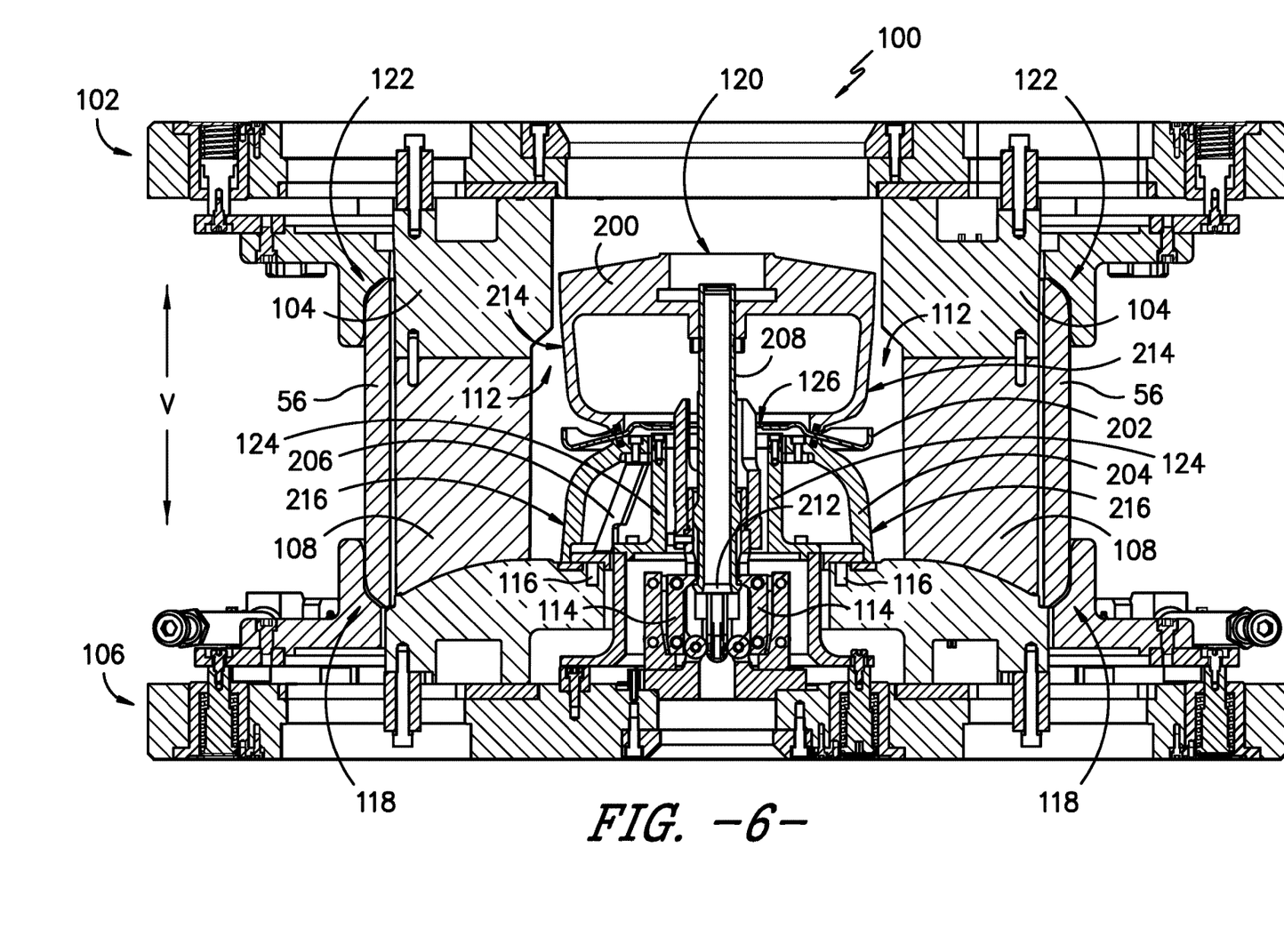
FIG. 6 is a cross-sectional view of the exemplary molding system of FIGS. 4 and 5 shown in a closed position with an exemplary first configuration of removable mold elements as may be used to manufacture the exemplary wheel of FIGS. 1 and 2.

Referring to FIGS. 4, 5, and 6, the first configuration FC, used for the exemplary embodiment of FIGS. 1 and 2, includes an upper mold bowl 200 having an upper mold bowl forming surface 214. Surface 214 forms part of the inner surface 64 of outer toroidal portion 58. A lower mold bowl 204 supports the upper mold bowl 200. Lower mold bowl 204 provides a lower mold bold forming surface 216 that also forms part of the inner surface 60 of outer toroidal portion 58.

Central mounting disk 202 is held in place between upper mold bowl 200 and lower mold bowl 204 when molding system 100 is in a closed position as shown in FIG. 6. It should be understood that central mounting disk 202 is part of non-pneumatic wheel 50 and is not part of first configuration FC of removable mold elements. Central mounting disk 202 is positioned to be embedded within hub 52 when molding material is poured into molding system 100 and fills the internal chamber or cavity 112 formed by mold portions 102 and 106 when molding system 100 is in the closed position.

A seal 224 is positioned between upper mold bowl 200 and lower mold bowl 204. When molding system 100 is in the closed position, seal 224 contacts bowls 200 and 204 to prevent the flow of molding material past seal 224 and into e.g., the interior of bowls 200 and 204. Seal 224 may be configured as e.g., an o-ring or gasket. Other constructions may be used as well.

First configuration FC also includes a retainer 206 configured for receipt of lower mold bowl 204. Retainer 206 attaches to lower mold portion 106 using fasteners 116 and fixes the position of lower mold bowl 204 within molding system 100. Retainer 206, bowl 200, and bowl 204 are positioned concentrically around a pilot 124 that projects along vertical direction V from lower mold portion 106.

A stem 208 extends from upper mold bowl 200 to a clasping mechanism 114 (FIG. 6). More particularly, when molding system 100 is in a closed position, stem 208 extends through an opening 218 in mounting disk 202, through an opening 220 in lower mold bowl 204, through an opening 126 in pilot 124, and through lower mold bowl retainer 206 to clasping mechanism 114. Stem 208 includes a distal end 210 extending along the vertical direction V away from upper mold bowl 200. An annular rib 212 is positioned at distal end 210 and allows clasping mechanism 114 to pull upper mold bowl 200 along vertical direction C towards the lower mold portion 106 as molding system 200 is placed into the closed position. As such, clasping mechanism 114 secures the upper mold bowl 200 and lower mold bowl 204 together with mounting disk 202 and seal 224 therebetween when in the closed position with first configuration FC within internal cavity 112.

Additionally, when in the closed position as shown in FIG. 6, load support band 56 is positioned between upper mold portion 102 and lower mold portion 106. Further, in the closed position, upper mold bowl 200 and lower mold bowl 204 are positioned concentrically within load support band 56. Similarly, upper web forming elements 204 and lower web forming elements 108 are positioned within load support band 56 when molding system 100 is in the closed position. As such, during molding operations, load support band 56 forms part of the mold when molding material is poured into the internal cavity 112 formed by the closing of molding apparatus 100. This allows the molding material to join with load support band 56 to form non-pneumatic wheel 50.

An exemplary method of using molding system 100 to manufacture exemplary non-pneumatic wheel depicted in FIGS. 1 and 2 will now be described. Using the teachings disclosed herein, it will be understood that other methods with different steps or a different sequence of steps may be used in still other exemplary methods of the present invention.

In one exemplary method, the molding surfaces of molding system 100 are cleaned. After a preheating step, the molding surfaces are treated with a coating to help release molding material after molding and curing. The molding system 100 is then moved to a loading station where the mold is opened by removing upper mold portion 102. Upper mold bowl 200 is removed from lower mold bowl 204, which is positioned on lower mold portion 106. Alternatively, if the molding system 100 has been used to manufacture a different wheel such as e.g., the exemplary embodiment of FIG. 3, it may be necessary to remove certain internal mold components such as those of second configuration SC from molding system 100. Then, the retainer 206 and lower mold bowl are installed onto lower mold portion 106.

Load support band 56 is placed within a complementary groove 118 defined by lower mold portion 106. Mounting disk 202 is placed onto lower mold bowl 204 and the upper mold bowl 200 is placed onto lower mold 204 and disk 202 by inserting stem 208 therethrough as previously described. Upper mold portion 102 is then placed back onto lower mold portion 106 and the mold is placed into the closed position shown in FIG. 6. Clasping mechanism 114 is used to pull upper mold bowl 200 towards the lower mold bowl 204 as previously described. In the closed position, load support band 56 is also received within a complementary groove 122 defined by upper mold portion 102.

The molding system 100 is heated again until e.g., a predetermined temperature is reached. Next, a molding material such as e.g., polyurethane or another material as previously described is poured into molding system 100. More specifically, the molding material is poured through e.g., opening 120 and allowed to fill internal cavity 112 formed by the closed position of the molding system The mold material fills the interstitial spaces formed by the upper and lower mold portions 102 and 106 to form wheel 50. During the pouring step, after the pouring step, or at the same time as the pouring step, molding assembly 100 is rotated to remove e.g., distribute the molding material within molding system 100 and remove bubbles that may be entrained in the molding material.

Molding system 100 is then placed into an oven for additional heating so as to cure the molding material. Once the molding material is cured, molding system 100 can be removed from the oven. Upper mold portion 102 can then be removed and non-pneumatic wheel 50 can be de-molded.

Figure 7:
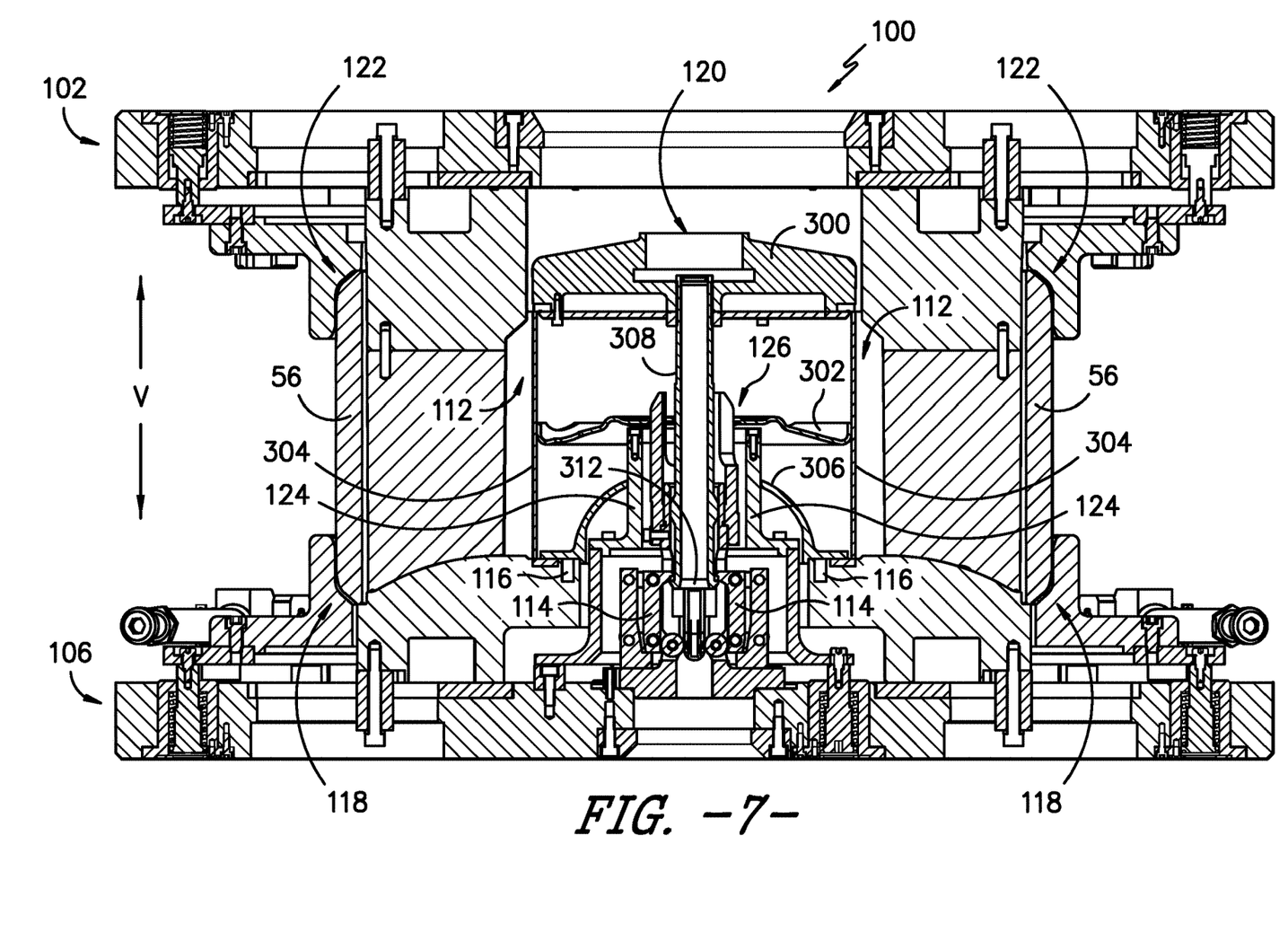
FIG. 7 is a cross-sectional view of the exemplary molding system of FIGS. 4 and 5 shown in a closed position with an exemplary second configuration of removable mold elements as may be used to manufacture the exemplary wheel of FIG. 3.

Referring to FIGS. 4, 5, and 7, the second configuration SC can be used for the exemplary embodiment of FIG. 3 and is interchangeable with first configuration FC. Second configuration SC includes a cap 300 having a stem 308 with an annular rib 312 at a distal end 310. When mold system 100 is in the closed position shown in FIG. 7, cap 300 rests upon hub 304. Mounting disk 302 is located within hub 304. Hub 304 is supported upon lower mold portion 106.

A shield 306 is positioned vertically below cap 300 onto the lower mold portion 106 and secured thereto with fasteners 116. Notably, the location of fasteners 116 about lower mold portion 106 is the same as are used to attach lower mold bowl retainer 206. Shield 306 prevents the migration of molding material inwardly along the radial direction.

Using annular rib 312, stem 308 is pulled along vertical direction V towards lower mold portion 106 using clasping mechanism 114 to secure cap 300 against hub 304 and both against lower mold portion 106 when the in the closed position with second configuration SC within internal cavity 112. In the closed position, load support band 56 is also received within a complementary groove 122 defined by upper mold portion 102.

Additionally, when in the closed position shown in FIG. 7, load support band 56 is positioned between upper mold portion 102 and lower mold portion 106. Further, in the closed position, cap 300 and hub 304 are positioned concentrically within load support band 56. Similarly, upper web forming elements 204 and lower web forming elements 108 are positioned within load support band 56 when molding system 100 is in the closed position. As such, during molding operations, hub 304 and load support band 56 forms part of the mold when molding material is poured into the internal cavity 112 formed by the closing of molding apparatus 100. This allows the molding material to join with hub 304 and load support band 56 to form non-pneumatic wheel 50. Hub 304 and mounting disk 302 form part of wheel 50 and are not part of the second configuration SC of removable mold elements.

As will be understood using the teachings disclosed herein, methods similar to that previously described for first configuration FC may be used to mold the exemplary wheel 50 of FIG. 3 using the second configuration SC. As previously stated, configurations FC and SC are interchangeable. Either configuration may be removed from molding system 100 to allow for installation of the other configuration depending upon the wheel hub configuration that will be manufactured.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An adjustable molding system for molding a non-pneumatic wheel, the non-pneumatic wheel including a load support band, a hub, and a plurality of tension-transmitting web elements extending between the load support band and the hub, the non-pneumatic wheel defining axial, radial, and circumferential directions, the molding system comprising:
   an upper mold portion having a plurality of upper web forming elements spaced apart around the circumferential direction;
   a lower mold portion having a plurality of lower web forming elements spaced apart around the circumferential direction and configured to receive the upper web forming elements when the molding system is in a closed position to form the tension transmitting web elements during a molding process, wherein the upper mold portion and lower mold portion form an internal cavity when the molding system is in the closed position;
   a first configuration of removable mold elements for positioning within the internal cavity, the first configuration comprising
      an upper mold bowl configured to form a surface of the wheel;
      a lower mold bowl supporting the upper mold bowl and configured to form a surface of the wheel;
      a retainer configured for receipt of the lower mold bowl, the retainer positionable onto the lower mold portion; and
   a second configuration of removable mold elements for positioning within the internal cavity, the second configuration comprising
      a cap;
      a shield positionable below the cap onto the lower mold portion;
   wherein the first and second configurations of removable mold elements are interchangeable within the internal cavity.

2. The adjustable molding system of claim 1, further comprising a stem extending towards the lower portion from the upper mold bowl, the stem extending through the lower mold bowl and the retainer to the lower mold portion.

3. The adjustable molding system of claim 1, further comprising a pilot projecting along a vertical direction from the lower mold portion.

4. The adjustable molding system of claim 3, wherein the retainer, upper bowl mold, and lower bowl mold are positioned concentrically around the pilot.

5. The adjustable molding system of claim 1, further comprising a stem extending towards the lower portion from the upper mold bowl, the stem extending through the lower mold bowl and the retainer to the lower mold portion, wherein the stem includes a distal end positioned away from the upper mold bowl, the distal end including an annular rib.

6. The adjustable molding system of claim 1, further comprising a seal positioned between the upper mold bowl and the lower mold bowl, the seal contacting both the upper mold bowl and the lower mold bowl so as to prevent the flow of molding material past the seal when the molding system is in the closed position and the first configuration is in the internal cavity.

7. The adjustable molding system of claim 1, further comprising a mounting disk positioned between the upper mold bowl and the lower mold bowl when the molding system is in the closed position with the first configuration in the internal cavity.

8. The adjustable molding system of claim 1, wherein the upper and lower web forming elements are positioned within the load support band when the molding system is in the closed position.

9. An adjustable molding system for manufacturing a non-pneumatic wheel having a plurality of tension-transmitting web elements, the molding system defining circumferential and radial directions, the molding system comprising:
   an upper mold portion having a plurality of upper web forming elements spaced apart around the circumferential direction;
   a lower mold portion having a plurality of lower web forming elements spaced apart around the circumferential direction and configured to receive the upper web forming elements when the molding system is in a closed position to form the tension transmitting web elements during a molding process, wherein the upper mold portion and lower mold portion form an internal cavity when the molding system is in the closed position;
   a first configuration of removable mold elements for positioning within the internal cavity, the first configuration comprising
      an upper mold bowl configured to form a surface of the wheel;
      a lower mold bowl supporting the upper mold bowl and configured to form a surface of the wheel;
      a retainer configured for receipt of the lower mold bowl, the retainer positionable onto the lower mold portion;
      a seal located between the upper mold bowl and the lower mold bowl when the molding system is in the closed position and the first configuration is in the internal cavity;
   and
   a second configuration of removable mold elements for positioning within the internal cavity, the second configuration comprising
      a cap;
      a shield positionable below the cap onto the lower mold portion; wherein the first and second configurations of removable mold elements are interchangeable within the internal cavity.

10. The adjustable molding system for manufacturing a non-pneumatic wheel of claim 9, further comprising a stem extending towards the lower portion from the upper mold bowl, the stem extending through the lower mold bowl and the retainer to the lower mold portion.

11. The adjustable molding system of claim 10, further comprising a pilot projecting along a vertical direction from the lower mold portion.

12. The adjustable molding system for manufacturing a non-pneumatic wheel of claim 11, wherein the retainer, upper bowl mold, and lower bowl mold are positioned concentrically around the pilot.

13. The adjustable molding system of claim 12, wherein the stem includes a distal end positioned away from the upper mold bowl, the distal end including an annular rib.

14. The adjustable molding system for manufacturing a non-pneumatic wheel of claim 10, further comprising a mounting disk positioned between the upper mold bowl and the lower mold bowl when the molding system is in the closed position with the first configuration in the internal cavity.

15. The adjustable molding system for manufacturing a non-pneumatic wheel of claim 9, wherein the non-pneumatic wheel includes a load support band, and wherein the upper mold portion and the lower mold portion are configured such that when the molding system is in the closed position with the first configuration in the internal cavity, the load support band is positioned between the upper mold portion and the lower mold portion.

16. The adjustable molding system for manufacturing a non-pneumatic wheel of claim 15, wherein the upper mold bowl and the lower mold bowl are positioned concentrically within the load support band when the molding system is in the closed position with the first configuration in the internal cavity.

17. The adjustable molding system for manufacturing a non-pneumatic wheel of claim 16, wherein the upper and lower web forming elements are positioned within the load support band when the molding system is in the closed position.

* * * * *